(12) United States Patent
Yang et al.

(10) Patent No.: US 7,362,389 B2
(45) Date of Patent: Apr. 22, 2008

(54) LIQUID CRYSTAL DISPLAY DEVICE AND FABRICATION METHOD THEREOF

(75) Inventors: Joon Young Yang, Gyeonggi-Do (KR); Yong In Park, Seoul (KR); Sang Hyun Kim, Gyeonggi-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 276 days.

(21) Appl. No.: 10/878,023

(22) Filed: Jun. 29, 2004

(65) Prior Publication Data

US 2005/0134752 A1    Jun. 23, 2005

(30) Foreign Application Priority Data

Dec. 23, 2003    (KR) .................. 10-2003-0095758

(51) Int. Cl.
*G02F 1/1343* (2006.01)
(52) U.S. Cl. .................. 349/38; 349/187; 349/47; 349/140
(58) Field of Classification Search .................. 349/43, 349/42, 38, 138–140, 187, 114, 113, 47, 39, 349/46, 143
See application file for complete search history.

(56) References Cited

U.S. PATENT DOCUMENTS

| | | | | |
|---|---|---|---|---|
| 5,680,190 A | * | 10/1997 | Michibayashi et al. | 349/140 |
| 6,344,888 B2 | * | 2/2002 | Yasukawa | 349/113 |
| 6,980,268 B2 | * | 12/2005 | You | 349/113 |
| 7,053,969 B2 | * | 5/2006 | Yamazaki et al. | 349/43 |

* cited by examiner

*Primary Examiner*—Thoi V. Duong
(74) *Attorney, Agent, or Firm*—McKenna Long & Aldridge LLP

(57) ABSTRACT

An LCD device and a fabrication method having a reduced number of masks and simplified fabrication processes. The method includes providing a substrate, forming an active pattern on the substrate, forming a first insulating layer on the substrate, forming a gate electrode and a pixel electrode on the substrate, forming a second insulating layer provided with a contract hole on the substrate, and forming source and drain electrodes respectively connected to a source region and a drain region through the contact hole.

13 Claims, 9 Drawing Sheets

LIQUID CRYSTAL DISPLAY DEVICE AND FABRICATION METHOD THEREOF

This application claims the benefit of Korean Patent Application No. 2003-095758, filed on Dec. 23, 2003, which is hereby incorporated by reference for all purposes as if fully set forth herein.

BACKGROUND OF THE INVENTION

1. Field of the Invention

The present invention relates to a liquid crystal display device, and more particularly, to a polycrystalline silicon thin film transistor liquid crystal display device capable of reducing the number of masks used to fabricate a thin film transistor and a fabrication method thereof.

2. Description of the Related Art

In the recent information oriented society, the importance of visual display devices has increased. Requirements for better display devices having low power consumption, reduced thickness, light weight and high picture quality have to be satisfied. Because the characteristics of LCD (liquid crystal display) devices satisfy all those conditions and are suitable for mass-production, various new LCD products have been rapidly developed. LCD devices have become the core technology gradually replacing the conventional CRT (cathode ray tube) devices.

In general, the liquid crystal display devices display a picture by adjusting a light transmittance ratio of liquid crystal cells by respectively supplying a data signal according to picture information to the liquid crystal cells arranged as a matrix form. To accomplish this, the liquid crystal display devices include a color filter substrate, an array substrate, and a liquid crystal material layer formed between the color filter substrate and the array substrate.

A thin film transistor (TFT) is generally used as a switching device for liquid crystal display devices. In addition, an amorphous silicon thin film or a polycrystalline silicon thin film is used as a channel layer of the thin film transistor.

In a fabrication process of the liquid crystal display devices, a great number of mask processes (that is, photolithography processes) are required to fabricate the array substrate that includes the thin film transistor. There is a need to reduce the number of the mask processes.

Figure 1:
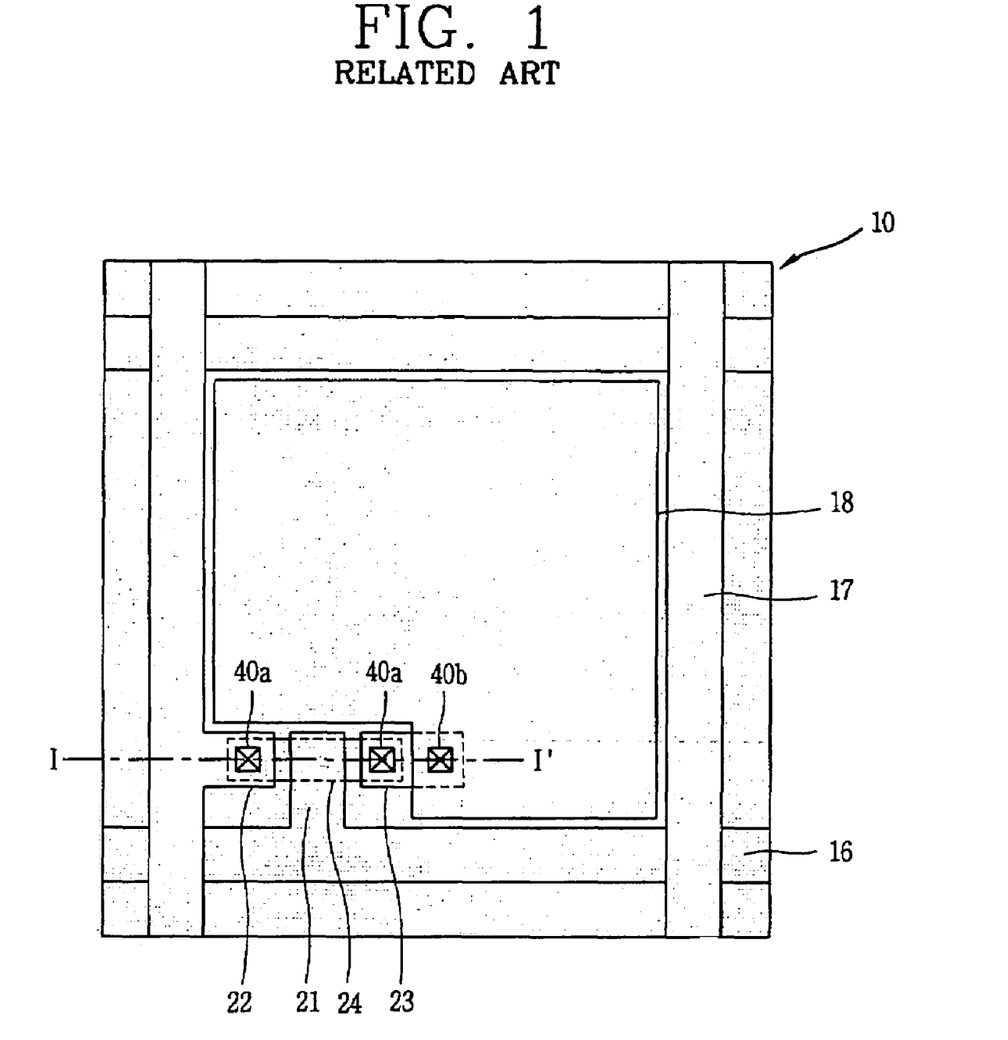
FIG. 1 is a plan view illustrating a part of an array substrate of a general liquid crystal display device.

FIG. 1 is a plan view illustrating a part of the array substrate of a related art liquid crystal display device, in which only one pixel is illustrated for convenience, although it is understood that if N gate lines and M data lines cross each other, then N×M pixels exist in the actual liquid crystal display device.

In FIG. 1, on the array substrate 10, a plurality of gate lines 16 and data lines 17 are arranged lengthwise and breadthwise, respectively, on the substrate 10 to define a plurality of pixel regions. In addition, a thin film transistor is formed at each crossing of a gate line 16 and a data line 17, and a pixel electrode 18 is formed at each pixel region.

The thin film transistor includes a gate electrode 21 connected to the gate line 16, a source electrode 22 connected to the data line 17, and a drain electrode 23 connected to the pixel electrode 18. Also, the thin film transistor includes first and second insulating layers (not illustrated) for insulating the gate electrode 21 and the source and drain electrodes 22 and 23, and an active layer 24 for forming a conductive channel between the source electrode 22 and the drain electrode 23 by a gate voltage supplied to the gate electrode 21.

The source electrode 22 is electrically connected to a source region of the active layer 24 through a first contact hole 40a formed on the insulating layers, and the drain electrode 23 is electrically connected to a drain region of the active layer 24 through the first contact hole 40a. A third insulating layer (not illustrated) provided with a second contact hole 40b is formed on the drain electrode 23, so that the drain electrode 23 and the pixel electrode 18 are electrically connected to each other through the second contact hole 40b.

Hereinafter, a fabrication process of a general liquid crystal display device will be described in more detail with reference to FIGS. 2A to 2F.

FIGS. 2A to 2F are sectional views taken along line I-I' of FIG. 1. FIGS. 2A to 2F illustrate a fabrication process of the liquid crystal display device in which the thin film transistor is a polycrystalline silicon thin film transistor using a crystalline silicon as an active layer and the thin film transistor is formed as a coplanar structure in which that the gate electrode, the source electrode, and the drain electrode are positioned on the same plane on the active layer.

Figure 2A:
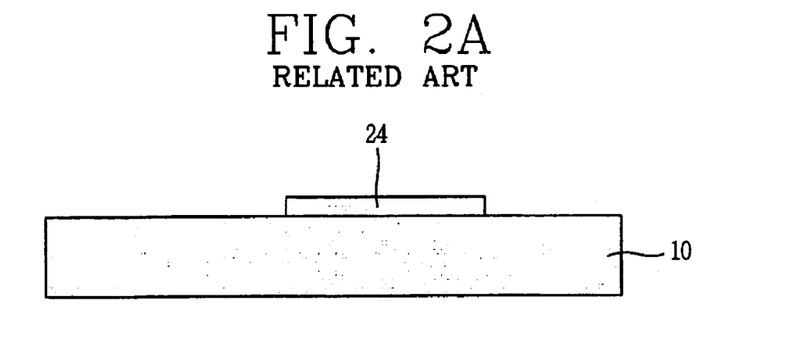
FIGS. 2A to 2F are sectional views sequentially illustrating a fabrication process of the liquid crystal display device taken along line I-I" of FIG. 1.

In FIG. 2A, an active pattern 24 composed of a polycrystalline silicon layer is formed on the substrate 10 using a photolithography process (hereinafter, "photo process").

Figure 2B:
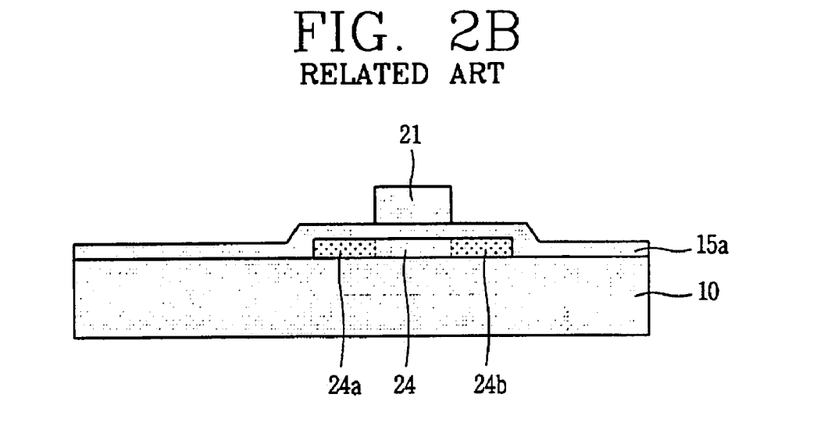

In FIG. 2B, a first insulating layer 15a and a conductive metal layer are deposited in turn on the entire surface of the substrate 10 where the active pattern 24 is formed, and then the conductive metal material is patterned using a photo process, thereby forming a gate electrode 21 on the active pattern 24 with the first insulating layer 15a interposed therebetween.

High concentration impurity ions are injected into a predetermined region of the active pattern 24 using the gate electrode 21 as a mask, thereby forming p+ or n+ type source and drain regions 24a and 24b. The source and drain regions 24a and 24b are formed to be ohmic-contacted with source and drain electrodes which will be later described.

Figure 2C:
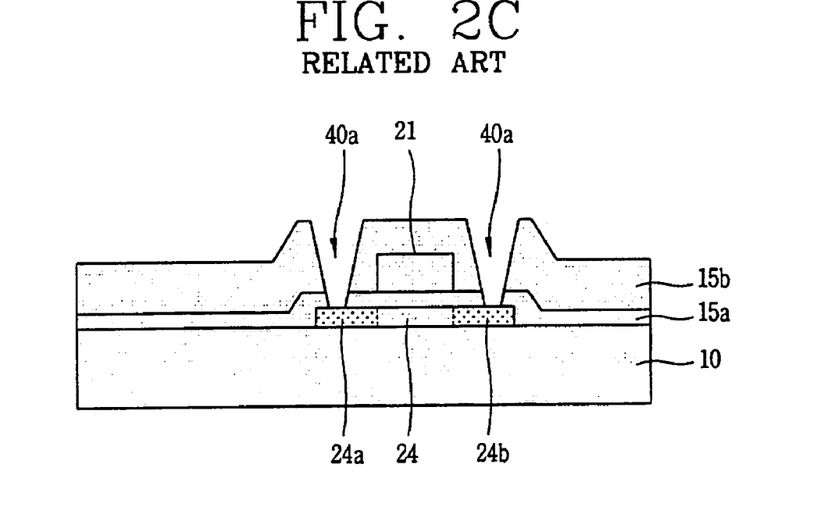

In FIG. 2C, a second insulating layer 15b is deposited on the entire surface of the substrate 10 where the gate electrode 21 is formed, and the second and first insulating layers 15b and 15a are partially removed by a photo process, thereby forming first contact holes 40a that partially expose the source and drain regions 24a and 24b.

Figure 2D:
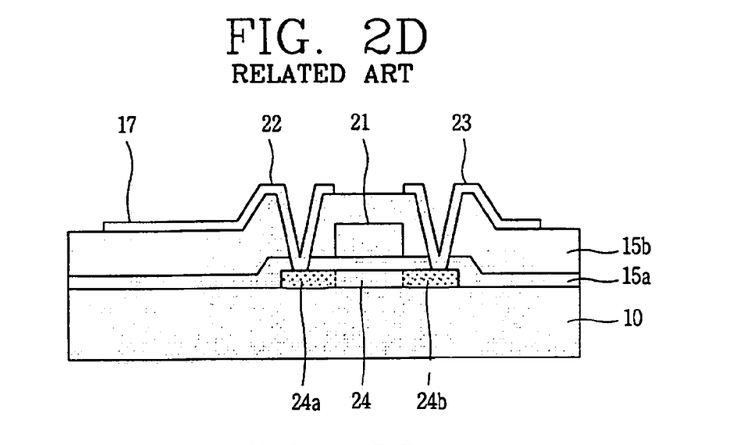

In FIG. 2D, a conductive metal material is deposited on the entire surface of the substrate 10 and a photo process is performed, thereby forming a source electrode 22 connected to the source region 24a and a drain electrode 23 connected to the drain region 24b through the first contact hole 40a. A part of the conductive metal layer constituting the source electrode 22 is extended in one direction thus making a data line 17.

Figure 2E:
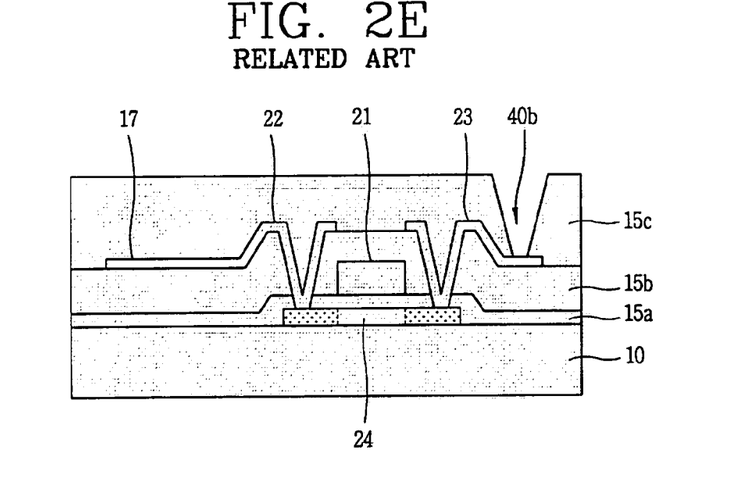

In FIG. 2E, a third insulating layer 15c is deposited on the entire surface of the substrate 10 and a second contact hole 40b that exposes a part of the drain electrode 23 is formed by a photo process.

Figure 2F:
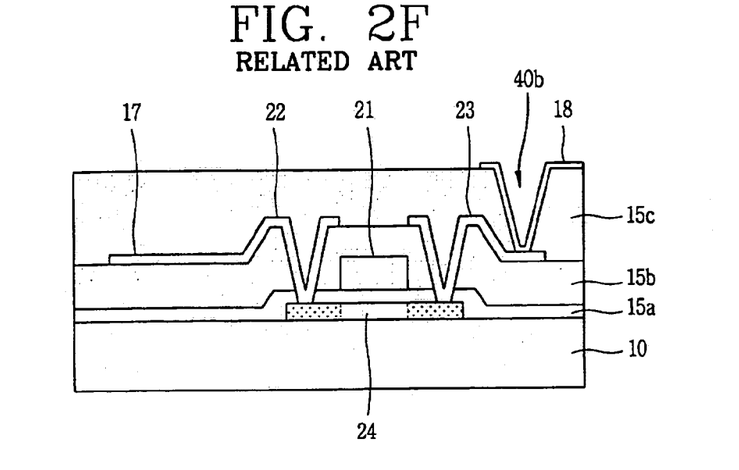

In FIG. 2F, a transparent conductive material is deposited on the entire surface of the substrate 10 where the third insulating layer 15c is formed, and a pixel electrode 18 connected to the drain electrode 23 through the second contact hole 40b is formed by a photo process.

As noted earlier, to fabricate the liquid crystal display device including the polycrystalline silicon thin film transistor, at least six photo processes are required to pattern elements such as the active pattern, the gate electrode, the first contact hole, the source and drain electrode, the second contact hole, and the pixel electrode.

The photo process is a series of processes for forming a desired pattern by transferring a pattern formed on a mask on a substrate where a thin film is deposited, and includes a plurality of processes such as a photoresist deposition, an exposure to light, a development process, and etc. Accordingly, the photo process lowers the production yield and may introduce defects on the formed thin film transistor.

In addition, because a photo mask designed for forming a pattern is very expensive, the fabrication cost of the liquid crystal display device is increases proportionally when the number of masks used in the process is increased.

SUMMARY OF THE INVENTION

Accordingly, the present invention is directed to a polycrystalline silicon thin film transistor liquid crystal display device and a fabrication method thereof that substantially obviates one or more the problems due to limitations and disadvantages of the related art.

In order to solve the above-mentioned problem, it is an advantage of the present invention is to provide a polycrystalline silicon thin film transistor liquid crystal display device capable of reducing the number of masks and a fabrication method thereof.

That is, the advantage of the present invention is to provide an liquid crystal display device capable of reducing the number of masks by improving a contact hole process by simultaneously patterning a gate electrode and a pixel electrode, and a fabrication method thereof.

To accomplish this, a transparent conductive layer for constituting a pixel electrode is first formed and then a conductive metal layer for a gate electrode is sequentially formed. Then, the gate electrode and the pixel electrode are simultaneously patterned by one photo process. Herein, the conductive metal layer remaining on the pixel electrode pattern can be removed by opening the pixel electrode region at the time of forming a contact hole.

To achieve these and other advantages and in accordance with the purpose of the present invention, as embodied and broadly described herein, there is provided an liquid crystal display device comprising: an insulating substrate, an active pattern on the substrate, a first insulating layer on the substrate, a gate electrode and a pixel electrode simultaneously patterned on the substrate, a second insulating layer on the substrate and provided with a contact hole, and source and drain electrodes on the substrate and respectively connected to a source region and a drain region through the contact hole.

A part of the source electrode is extended thus to be connected to a data line, and a part of the drain electrode is extended towards a pixel region thus to be connected to a pixel electrode.

The pixel electrode is constructed as a transparent conductive material such as an indium-tin-oxide or indium-zinc-oxide, and the gate electrode can be constructed as a double layer that an opaque conductive material is deposited on the same transparent conductive material as the pixel electrode.

A storage electrode in the pixel region parallel to the gate line can be further included, and the storage electrode can constitute a pixel electrode and a storage capacity with interposing the first insulating layer therebetween.

To achieve these and other advantages and in accordance with the purpose of the present invention, as embodied and broadly described herein, there is also provided a fabrication method of an liquid crystal display device comprising the steps of: providing a substrate, forming an active pattern on the substrate, forming a first insulating layer on the substrate, forming a gate electrode and a pixel electrode on the substrate, forming a second insulating layer provided with a contact hole on the substrate, and forming source and drain electrodes respectively connected to a source region and a drain electrode through the contact hole.

At the time of forming the active pattern, a step of forming a storage electrode in a pixel region with the same material as the active pattern can be further comprised, and the storage electrode can constitute the pixel electrode and the storage capacitor with interposing the first insulating layer therebetween.

The step of simultaneously forming the gate electrode and the pixel electrode comprises the steps of: sequentially forming a first conductive metal layer and a second conductive metal layer on the substrate, patterning the second and first conductive metal layers and thereby forming a gate electrode pattern and a pixel electrode pattern, forming a second insulating layer on the substrate, partially removing the second insulating layer and the first insulating layer and thereby forming a contact hole that partially exposes the source region and the drain region, and removing the second insulating layer on the pixel electrode pattern, and removing the second conductive metal pattern remaining on the pixel electrode pattern.

Herein, the first conductive metal layer or the second conductive metal layer can be constructed as a transparent conductive material such as an indium-tin-oxide or an indium-zinc-oxide, and the second conductive metal layer can be constructed as an opaque conductive material such as Al, Al alloy, W, Cu, Cr, and Mo.

A contact hole mask for forming the contact hole includes a pixel electrode pattern, and the second insulating layer on the pixel electrode pattern can be removed using the mask.

It is to be understood that the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Active matrix (AM) is a driving method often used in liquid crystal display devices. AM LCD devices drive the pixels of a pixel region in the liquid crystal display devices using a thin film transistor as a switching device in each of the pixels. As a channel layer of the thin film transistor, amorphous silicon or polycrystalline silicon can be used.

The amorphous silicon thin film transistor technique was first described by English LeComber at al. in 1979, and was commercialized as a 3-inch liquid crystal portable television in 1986. Recently, amorphous silicon thin film transistor liquid crystal display devices having large display areas overover 50 inches have been developed.

However, the field effect mobility of the amorphous silicon thin film transistor of about (<1 $cm^2$/Vsec) prevents its use in peripheral circuits that apply signals to the pixel region, because peripheral circuits operate at more than 1 MHz. Accordingly, research for simultaneously forming a switching transistor in a pixel region and peripheral circuits in a driving circuit region together on a glass substrate using a polycrystalline silicon thin film transistor having a field effect mobility greater than that of the amorphous silicon thin film transistor has been actively pursued.

The polycrystalline silicon thin film transistor technique has been applied to small modules for camcorders and other small-display portable devices. Due to the low photosensitivity, the high electric field effect, and the mobility of the polycrystalline silicon thin film transistor, a driving circuit can be directly fabricated on a substrate.

Increased mobility enhances the operation frequency of the driving circuits which determines the number of driving pixels that can be driven to maintain an adequate display capability. More specifically, the increased frequency decreases the charging time of a signal applied to a pixel such that distortion of the signal is decreased and picture quality is increased.

Additionally, because the polycrystalline silicon thin film transistor has a driving voltage of under 10V when compared to the amorphous silicon thin film transistor, which has a high driving voltage of about 25V, it consumes less power.

However, The fabrication of a liquid crystal display device including the polycrystalline silicon thin film transistor requires a large number of photo processes and thereby increases the fabrication cost.

In order to solve this problem, the number of masks used at the time of fabricating a thin film transistor has to be reduced.

Hereinafter, an liquid crystal display device according to the present invention and a fabrication method thereof will be explained in more detail with reference to the attached drawings.

Figure 3:
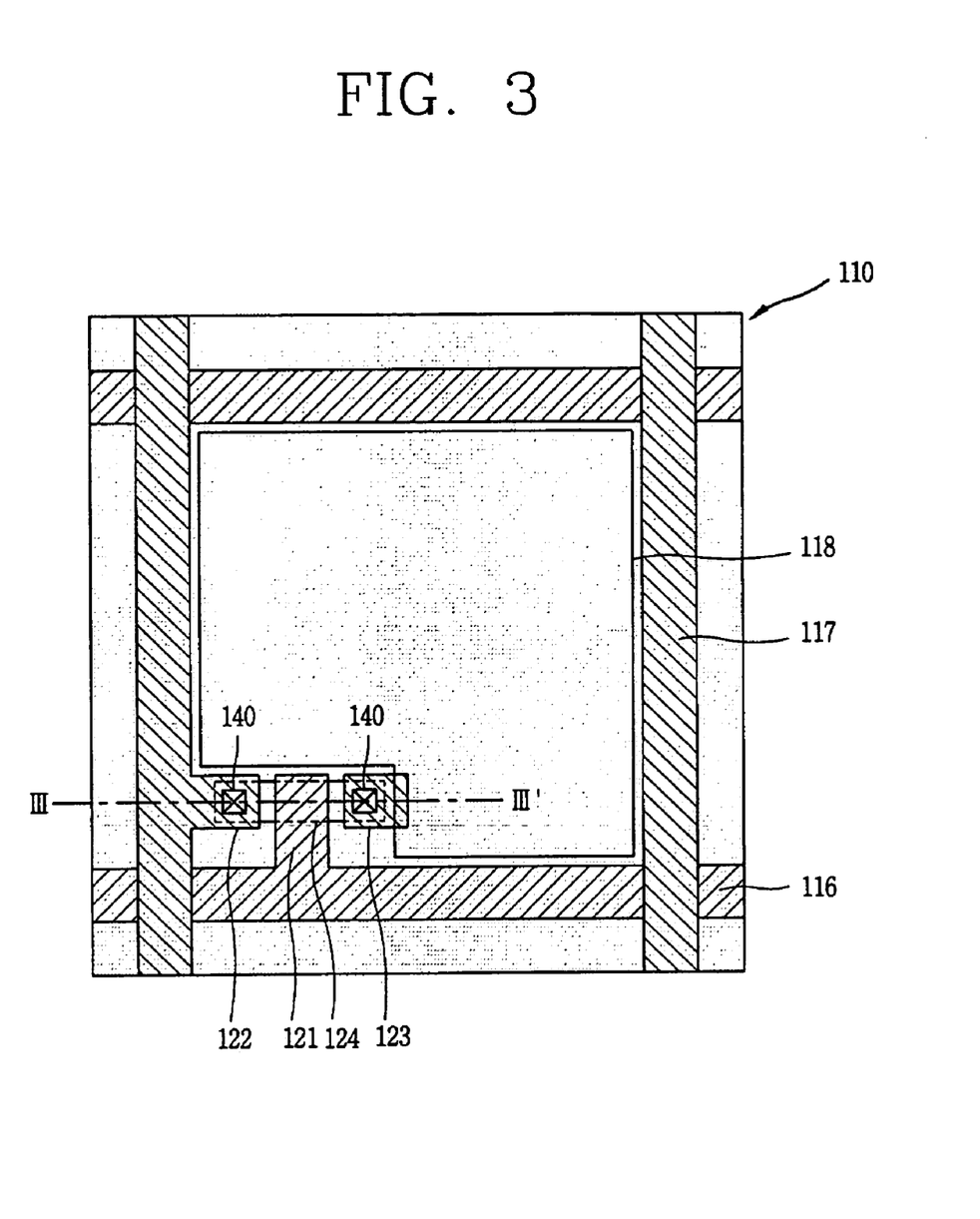
FIG. 3 is a plan view illustrating a part of an array substrate of a liquid crystal display device according to one embodiment of the present invention.

FIG. 3 is a plan view illustrating a part of an array substrate of an liquid crystal display device according to one exemplary embodiment of the present invention. In FIG. 3, only one pixel is illustrated for the sake of simplicity, although it is understood that if N gate lines and M data lines cross each other, then N×M pixels exist in the actual liquid crystal display device.

As illustrated, an array substrate 110 includes: a pixel electrode 118 formed on a pixel region, a gate line 116 and a data line 117 arranged horizontally and vertically on the substrate 110, and a thin film transistor formed at the crossing region between the gate line 116 and the data line 117 as a switching device.

The thin film transistor has a gate electrode 121 connected to the gate line 116, a source electrode 122 connected to the data line 117, and a drain electrode 123 connected to the pixel electrode 118. Also, the thin film transistor includes first and second insulating layers (not illustrated) for insulating the gate electrode 121 and the source and drain electrodes 122 and 123, and an active layer 124 for forming a conductive channel between the source electrode 122 and the drain electrode 123 when a gate voltage is supplied to the gate electrode 121.

Herein, through a contact hole 140 formed on the second and third insulating layers, a part of the source electrode 122 is electrically connected to a source region of the active layer 124 and a part of the drain electrode 123 is electrically connected to a drain region of the active layer 124. Another part of the source electrode 122 is connected to the data line 117 thereby to constitute a part of the data line 117, and another part of the drain electrode 123 is extended towards a pixel region thus to be connected to the pixel electrode 118.

The pixel electrode 118 is formed by being simultaneously patterned with the gate electrode 121, thereby reducing the number of masks used at the time of the thin film transistor fabrication. That will be explained in more detail with reference to the following liquid crystal display device fabrication process.

FIGS. 4A to 4E are exemplary views taken along line III-III' of FIG. 3 illustrating a fabrication process of the liquid crystal display device.

Figure 4A:
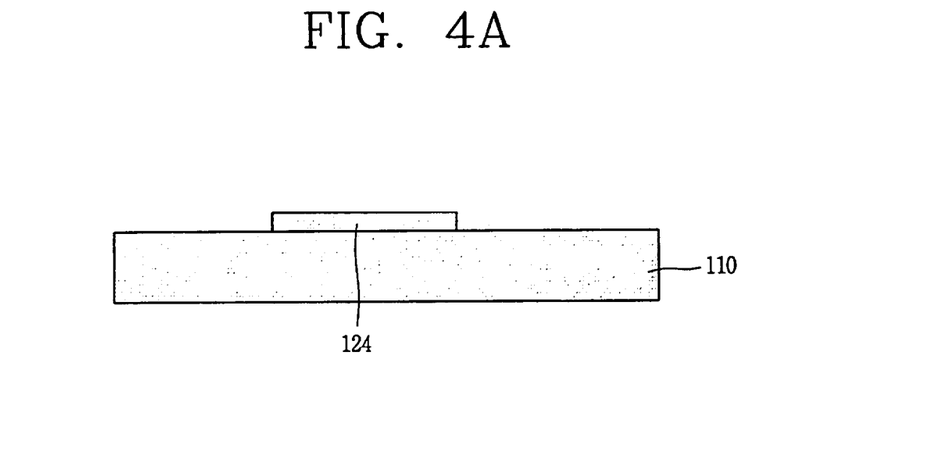
FIGS. 4A to 4E are exemplary views sequentially illustrating a fabrication process of the liquid crystal display device taken along line III-III' of FIG. 3.

In FIG. 4A, an active pattern 124 serving as a channel layer is formed on the substrate 110. The substrate 110 is formed of a transparent insulating material such as glass.

Herein, it is possible to form a buffer layer having a silicon oxidation layer ($SiO_2$) on the substrate 110 and then to form the active pattern 124 on the buffer layer. The buffer layer prevents impurities such as sodium (Na) or the like that are present in the the glass substrate 110 from penetrating into an upper layer during the process.

The active pattern 124 may be formed of an amorphous silicon thin film or a polycrystalline silicon thin film. In the present exemplary embodiment, the silicon layer is formed of a polycrystalline silicon thin film. The polycrystalline silicon thin film may be formed using several crystallization methods after depositing an amorphous silicon thin film on the substrate 110, which will be explained as follows.

The amorphous silicon thin film may be deposited by several methods such as a low pressure chemical vapor deposition (LPCVD) and a plasma enhanced chemical vapor deposition (PECVD).

Then, a dehydrogenation process is performed for removing hydrogen existing in the amorphous silicon thin film, and then crystallization is performed. The method for crystallizing the amorphous silicon thin film includes a solid phase crystallization (SPC) method which thermally-processes the amorphous silicon thin film at a high temperature, and an excimer laser annealing (ELA) method which uses a laser.

For the excimer laser annealing method, a pulsed laser is mainly used. However, recently, a sequential lateral solidification (SLS) method for greatly improving a crystallization characteristic by growing a grain in a horizontal direction is being pursued.

The sequential lateral solidification method is based upon the fact that a crystal grain grows in a perpendicular direction at an interface between a liquid phase silicon and a solid phase silicon. The sequential lateral solidification method increases the size of a silicon grain by laterally growing the grain as much as a predetermined length by properly controlling the amount of laser energy and an irradiation range of a laser beam.

Figure 4B:
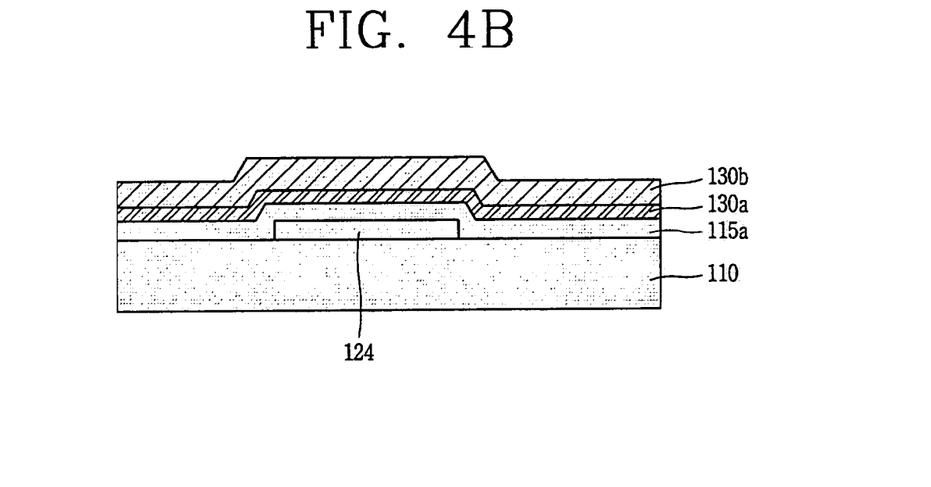
Figure 4C:
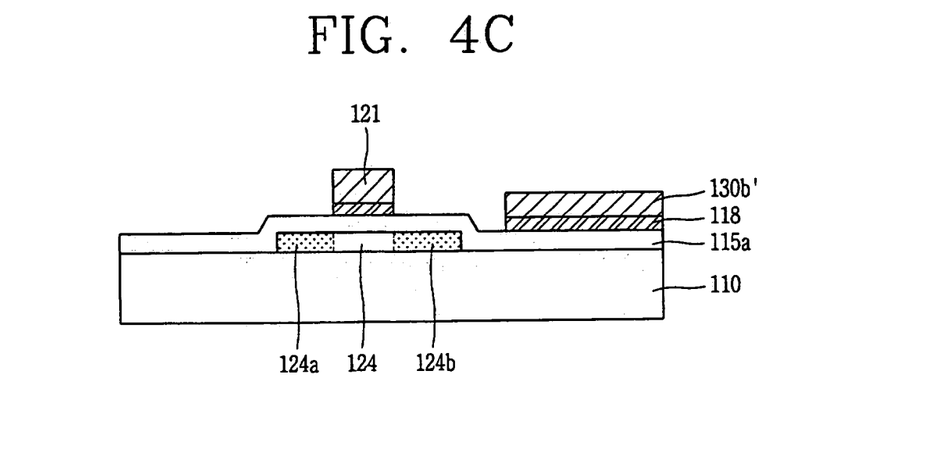

FIGS. 4B and 4C are views illustrating a process for forming a gate electrode pattern and a pixel electrode pattern using one mask. In FIG. 4B, a first insulating layer 115a is a gate insulating layer, a first conductive metal layer 130a and a second conductive metal layer 130b are formed on the entire surface of the substrate 110.

The first conductive metal layer 130a is formed of a transparent conductive material having excellent transmissivity such as an indium-tin-oxide (ITO) or an indium-zinc-oxide (IZO) in order to constitute the pixel electrode, and the second conductive metal layer 130b is formed of a conductive material such as Al, Al alloy, W, Cu, Cr, Mo, and etc. in order to constitute the gate electrode and the gate line.

In FIG. 4C, the second conductive metal layer 130b and the first conductive metal layer 130a are patterned using a photo process, thereby forming the gate electrode 121 and the pixel electrode 118.

A second conductive metal layer pattern 130b' having the same form as the pixel electrode 118 remains on the pixel electrode 118 composed of the first conductive metal.

Impurity ions are then injected into a predetermined region of the active pattern 124 using the gate electrode 121 as a mask, thereby forming a source region 124a and a drain region 124b as an ohmic contact layer. The gate electrode 121 serves as an ion-stopper for preventing a dopant from penetrating into the channel region of the active pattern 124.

An electric characteristic of the active pattern 124 varies in accordnace with the kind of dopant injected. If the injected dopant corresponds to a third group such as B, the active pattern 124 is operated as a P-type thin film transistor. In addition, if the injected dopant corresponds to a fifth group such as P, the active pattern 124 is operated as an N-type thin film transistor.

A process for activating the injected dopant after the ion injection process may also be performed.

Figure 4D:
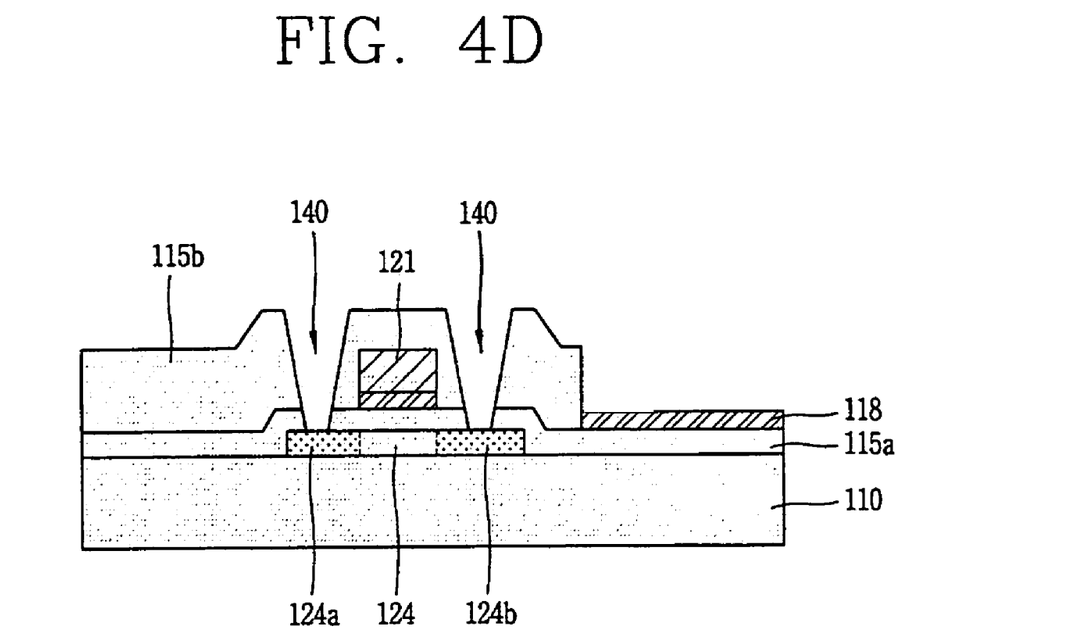

In FIG. 4D, a second insulating layer 115b is deposited on the entire surface of the substrate where the gate electrode 121 and the pixel electrode 118 are formed. Then, the second insulating layer 115b and the first insulating layer 115a are partially removed by a photo process, thereby forming contact holes 140 that partially exposed the source region 124a and the drain region 124b.

The second insulating layer 115b can be formed of a transparent organic insulating material such as benzocyclobutene (BCB) or acryl based resin for a high aperture ratio.

At this time, the second insulating layer 115b formed on the pixel electrode 118 is removed using the same mask as the pixel electrode 118 formed on the pixel region, thereby exposing the second conductive metal pattern 130b.

Then, the second conductive metal pattern 130b' remaining on the pixel electrode 118 is removed thereby exposing the pixel electrode 118 made of the transparent conductive material. The second conductive metal pattern 130b' is etched without an additional mask in the process of forming the contact holes 140 at the second insulating layer 115b.

Figure 4E:
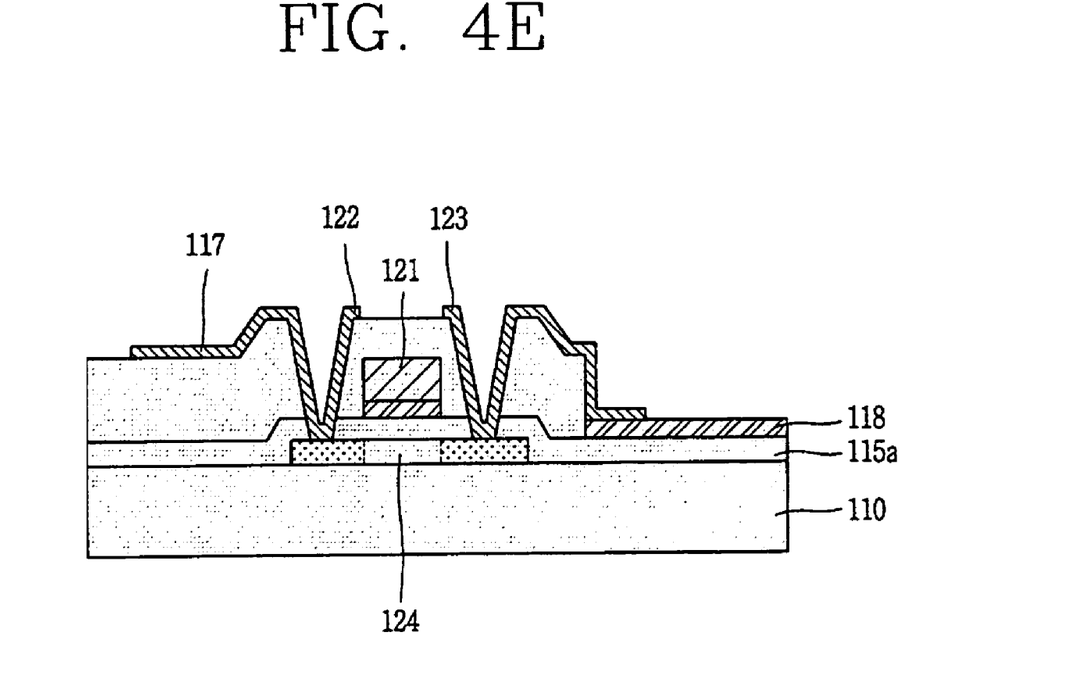

FIG. 4E illustrates a conductive metal material deposited on the substrate 110, and a source electrode 122 connected to the source region 124a through the contact hole 140 and a drain electrode 123 connected to the drain region 124b through the contact hole 140 that are formed by a photo process.

A part of the source electrode 122 is extended to connect to the data line 117, and a part of the drain electrode 123 is extended towards a pixel region to connect to the pixel electrode 118.

In the fabrication process of the liquid crystal display device according to the first exemplary embodiment of the present invention, the gate electrode and the pixel electrode are simultaneously patterned by one mask process and the contact hole forming process is reduced by one step, thereby reducing the number of mask processes by two. As the result, the fabrication process is simplified thereby increasing fabrication yield and reducing fabrication cost.

The pixel electrode of the array substrate constitutes a liquid crystal capacitor with the common electrode of the color filter substrate. A voltage applied to the liquid crystal capacitor is not maintained but leaked until the next signal is applied. Therefore, in order to maintain the applied voltage, a storage capacitor may be connected to the liquid crystal capacitor.

The storage capacitor not only maintains a data signal but also stabilizes a gray scale display and reduces an afterimage. The liquid crystal display device of the present invention including the storage capacitor will be explained in more detail.

Figure 5:
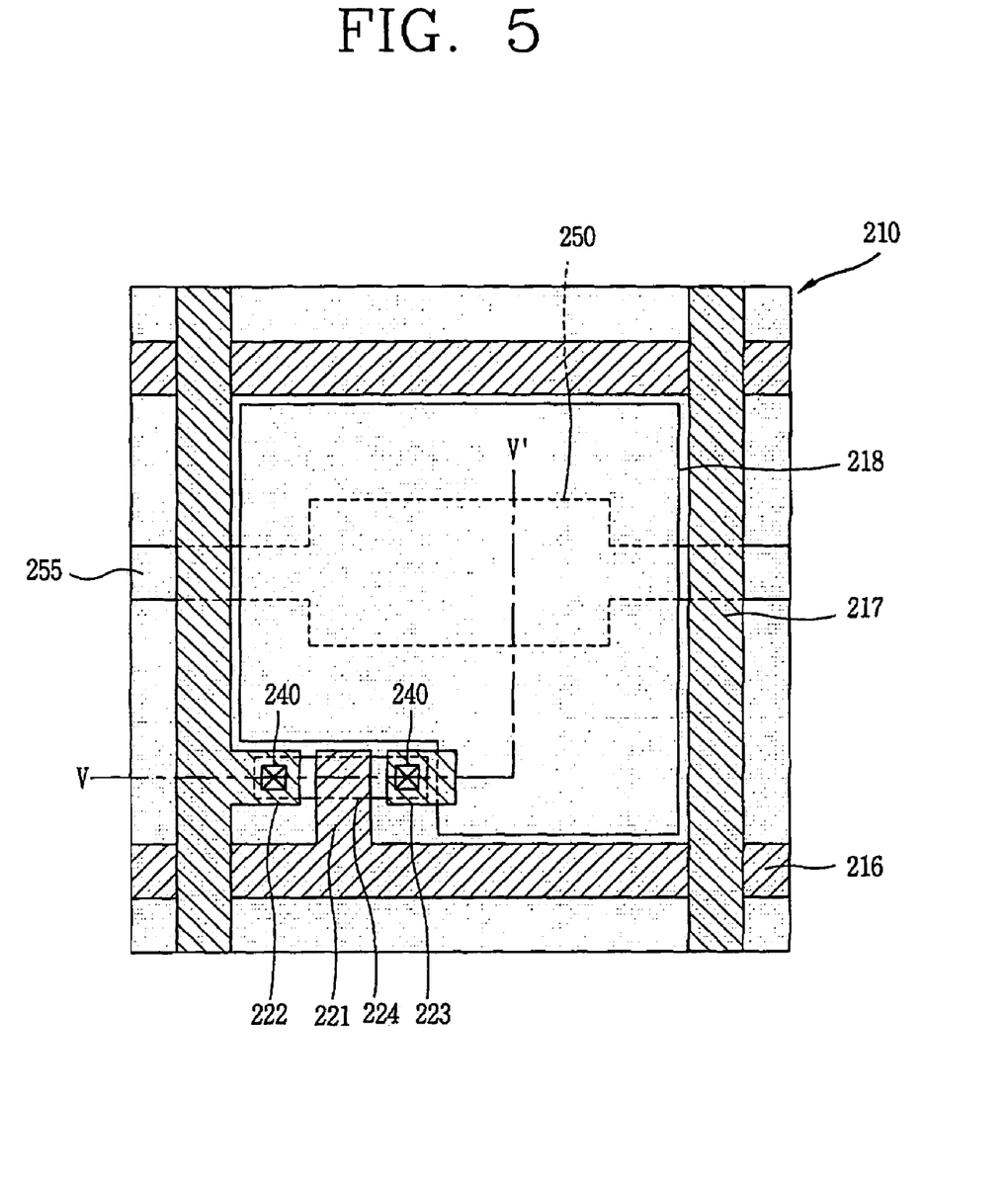
FIG. 5 is a plan view illustrating a part of an array substrate of an liquid crystal display device according to a second embodiment of the present invention.

FIG. 5 is a plan view illustrating a part of an array substrate of a liquid crystal display device according to a second embodiment of the present invention, which illustrates a case where the storage capacitor is formed in the pixel region.

The liquid crystal display device according to the second embodiment has the same structure as the liquid crystal display device of FIG. 3 according to the first embodiment except for the storage capacitor. Descriptions of similar structures will therefore be omitted.

As illustrated, a gate line 216 and a data line 217 for defining a pixel region by being arranged horizontally and vertically are formed on an array substrate 210. In addition, a TFT is formed at the crossing of the gate line 216 and the data line 217, and a pixel electrode 218 is formed on the pixel region.

A storage line 255 is formed in the pixel region in the same direction as the gate line 216.

The storage line 255 includes a storage electrode 250 accordingly as a certain width thereof is increased in an image display region. The storage line 255 including the storage electrode 250 may be formed of the same material as an active pattern 224 at the time of forming the active pattern 224.

An overlapped part of the storage electrode 250 and the pixel electrode 218 that is a transparent electrode constitutes a storage capacitor with a first insulating layer (not illustrated) interposed therebetween, which will be explained in more detail with reference to the fabrication process of the liquid crystal display device.

Figure 6A:
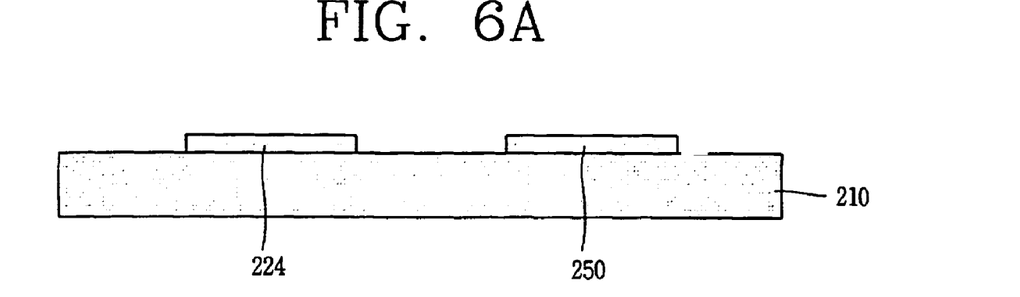
FIGS. 6A to 6E are exemplary views sequentially illustrating a fabrication process of the liquid crystal display device taken along line V-V' of FIG. 5.

In FIG. 6A, the active pattern 224 to be used as a channel layer and the storage line for the storage capacitor (that is, the storage electrode 250 and the storage line (not illustrated)) are formed on the substrate 210 formed of a transparent insulating material such as glass.

Figure 6B:
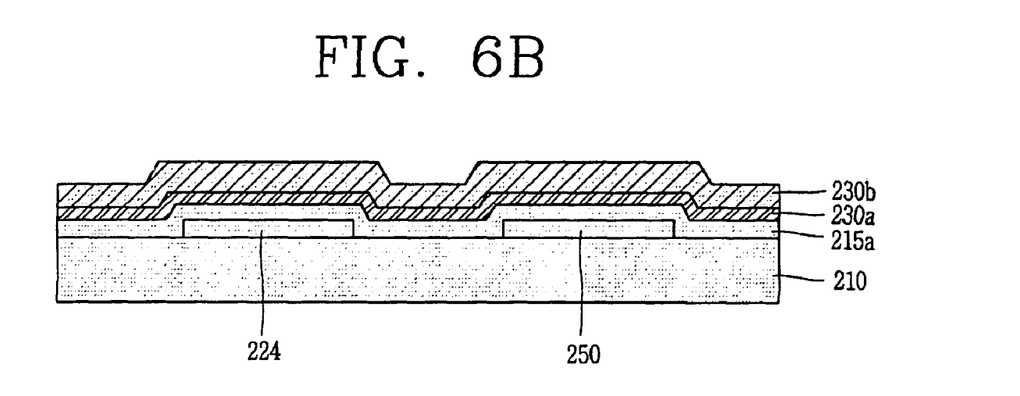

In FIG. 6B, a first insulating layer 215a, a first conductive metal layer 230a, and a second conductive metal layer 230b are sequentially formed on the entire surface of the substrate 210.

As aforementioned, the first conductive metal layer 230a is formed of a transparent conductive material having an excellent light transmission properties, and the second conductive metal 230b is formed of a low resistance conductive material.

Figure 6C:
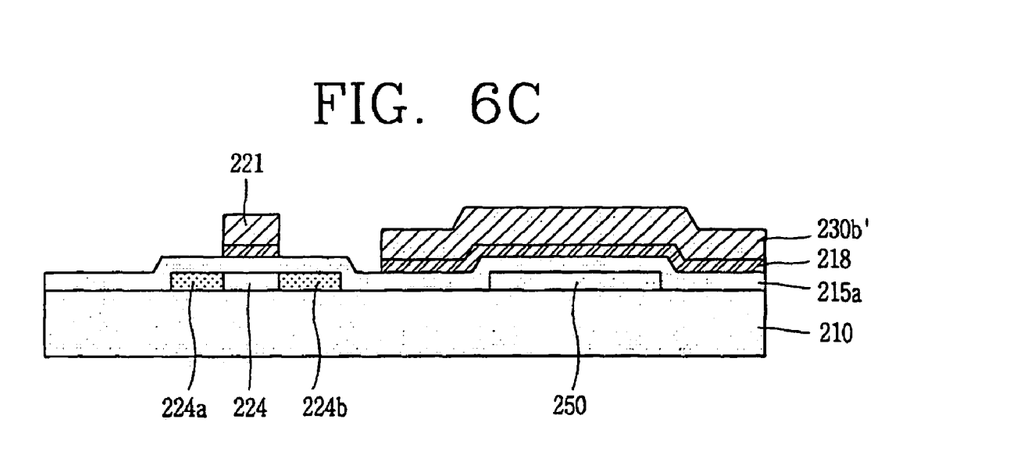

In FIG. 6C, the second conductive metal layer 230b and the first conductive metal layer 230a are patterned by a photo process, thereby forming the gate electrode 221 and the pixel electrode 218.

The pixel electrode 218 is formed on the storage electrode 250 having the first insulating layer 215a interposed therebetween to form the storage capacitor.

On the pixel electrode 218 composed of the first conductive metal, a second conductive metal pattern 230b' having the same pattern as the pixel electrode 218 still remains after the photo process.

Impurity ions are injected into a predetermined region of the active pattern 224 using the gate electrode 221 as a mask, thereby forming a source region 224a and a drain region 224b, an ohmic contact layer.

Figure 6D:
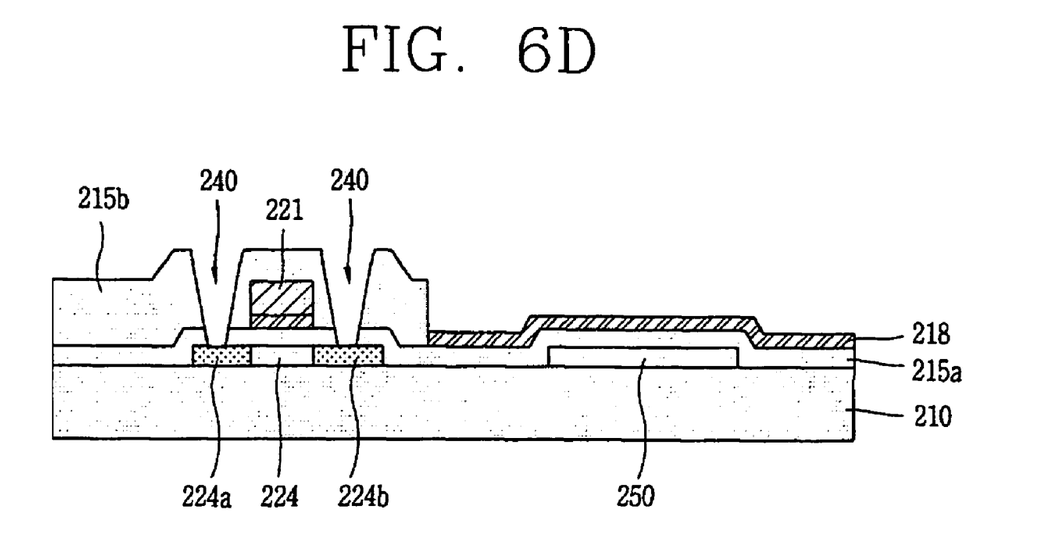

In FIG. 6D, a second insulating layer 215b is deposited on the entire surface of the substrate where the gate electrode 221 and the pixel electrode 218 are formed, and the second insulating layer 215b and the first insulating layer 215a are partially removed by a photo process thereby to form a contact holes 240 that partially exposes of the source region 224a and the drain region 224b.

Herein, the second insulating layer 215b formed on the pixel electrode 218 is removed using the same mask as the pixel electrode 218 formed at the pixel region, thereby exposing the second conductive metal pattern 230b'.

Then, the second conductive metal pattern 230b' remaining on the pixel electrode 218 is removed, thereby exposing the pixel electrode 218 made of a transparent conductive material.

Figure 6E:
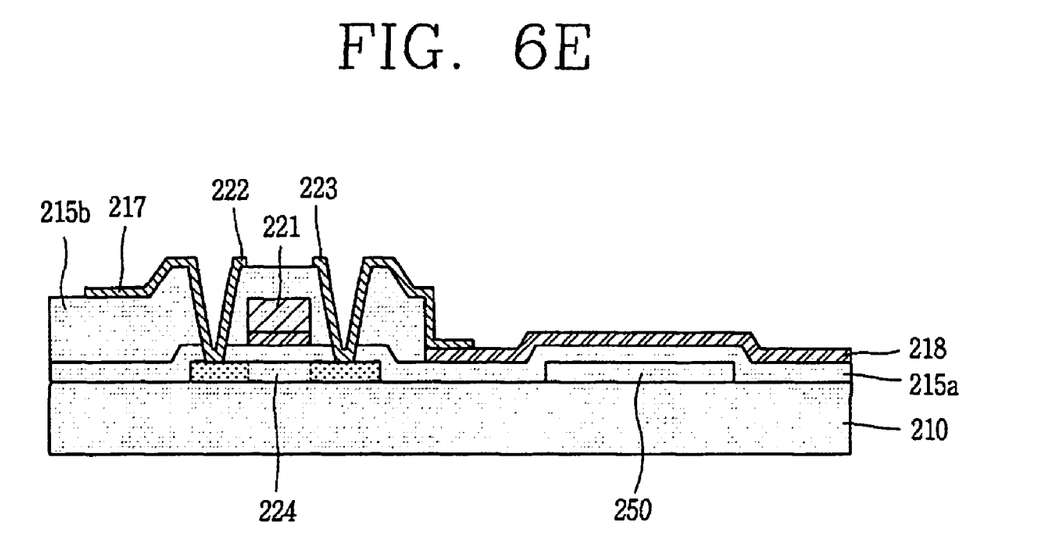

In FIG. 6E, a conductive metal material is deposited on the substrate 210, and a source electrode 222 connected to the source region 224a through the contact hole 240 and a drain electrode 223 connected to the drain region 224b through the contact hole 240 are formed by a photo process.

According to the second exemplary embodiment of the present invention, the storage electrode for the storage capacitor is made of the same material as the active pattern thus forming the pixel electrode and the storage capacitor, thereby obtaining an additional capacitance without an additional process.

The storage electrode is made of a polycrystalline silicon thin film having the same material as the active pattern, thereby improving an aperture ratio of an liquid crystal display panel over that of the conventional storage electrode formed of an opaque metal material.

As aforementioned, in the liquid crystal display device and the fabrication method thereof according to the present invention, the gate electrode and the pixel electrode are simultaneously patterned thus to reduce the number of masks used, thereby reducing a fabrication process and a fabrication cost.

Herein, the pixel electrode does not require an additional contact hole for an electrical contact with the drain electrode, thereby reducing the complexity of the fabrication process and reducing the fabrication cost.

In addition, in the present invention, the silicon layer used as the active pattern is composed of the storage electrode to thereby make the storage capacitor, thus obtaining a sufficient capacitance and increasing an aperture ratio.

It will be apparent to those skilled in the art that various modifications and variation can be made in the present invention without departing from the spirit or scope of the invention. Thus, it is intended that the present cover the modifications and variations of this invention provided they come within the scope of the appended claims and their equivalents.

What is claimed is:

1. A fabrication method of a liquid crystal display device, comprising:
   providing a substrate;
   forming a storage electrode extending from a storage line wherein the storage electrode is formed directly on the substrate;
   forming an active pattern on the substrate;
   forming a first insulating layer on the substrate;
   forming a gate electrode and a pixel electrode on the substrate, wherein the storage electrode constitutes the pixel electrode and a storage capacitor having the first insulating layer interposed therebetween;
   forming a second insulating layer provided with contact holes on the substrate;
   forming source and drain electrodes respectively connected to a source region and a drain region through the contact hole; and
   removing a conductive layer remaining on the pixel electrode.

2. The method of claim 1, wherein the active pattern is formed of a silicon thin film.

3. The method of claim 2, wherein the silicon thin film is a crystallized silicon thin film.

4. The method of claim 1, further comprising forming the storage electrode at a pixel region with the same material as the active pattern at the time of forming the active pattern.

5. The method of claim 1, further comprising a step of forming the source region and the drain region by injecting impurity ions into a predetermined region of the active pattern using the gate electrode as a mask after forming the gate electrode.

6. The method of claim 5, wherein the impurity ion belongs to a fifth group such as P.

7. The method of claim 5, wherein the impurity ion belongs to a third group such as B.

8. The method of claim 1, wherein a part of the source electrode is extended and connects to a data line.

9. The method of claim 1, wherein a part of the drain electrode is extended towards a pixel region and electrically connects to the pixel electrode.

10. A fabrication method of a liquid crystal display device, comprising:
    providing a substrate;
    forming an active pattern on the substrate;
    forming a first insulating layer on the substrate;
    forming a gate electrode and a pixel electrode on the substrate;
    forming a second insulating layer provided with contact holes on the substrate; and
    forming source and drain electrodes respectively connected to a source region and a drain region through the contact hole; wherein forming the gate electrode and the pixel electrode comprises:
    sequentially forming a first conductive metal layer and a second conductive metal layer on the substrate;
    patterning the second and first conductive metal layers and thereby forming a gate electrode pattern and a pixel electrode pattern;
    forming a second insulating layer on the substrate;
    partially removing the second insulating layer and the first insulating layer to form a contact hole that partially exposes the source region and the drain region, and removing the second insulating layer on the pixel electrode pattern; and removing the second conductive metal pattern remaining on the pixel electrode pattern.

11. The method of claim 10, wherein the first conductive metal layer or the second conductive metal layer is made of a transparent conductive material selected from indium-tin-oxide and indium-zinc-oxide.

12. The method of claim 10, wherein the second conductive metal layer is an opaque conductive material such as Al, Al alloy, W, Cu, and Mo.

13. The method of claim 10, wherein a contact hole mask for forming the contact hole includes a pixel electrode pattern, and the second insulating layer on the pixel electrode pattern is removed using the mask.

* * * * *